2,749,259

STABILIZED STARCH SLURRIES

James W. Evans and Glen E. Nelson, Highland, Ind., assignors to American Maize-Products Company, a corporation of Maine No Drawing. Application October 4, 1952,
Serial No. 313,195

3 Claims. (Cl. 127—32)

This invention relates to the preparation of aqueous slurries of starch for shipment by tank cars and tank trucks.

Heretofore it has been considered impractical to ship aqueous slurries of raw uncooked starch in tank car lots because the slurries are not stable and granules of raw starch tend to settle out and form a highly compact mass in the bottom of the car. As a result, unloading presents a problem. The compact mass cannot be readily pumped away and it is extremely difficult and expensive to dig the separated starch out of the bottom of the tank car.

The present invention is based upon our discovery that stable slurries of raw uncooked starch containing up to about forty-five percent total starch solids can be achieved by suspending raw starch granules in an aqueous dispersion of coked starch. When this is done, the raw starch granules are held in suspension over a prolonged period of time which makes our slurry particularly adapted for shipment in tank cars and tank trucks. For a slurry containing up to about 42% to 45% starch solids the amount of cooked starch employed approximates about 1% to 10% by weight of the total starch solids in the slurry and preferably 2% to 8%. If more than 10% of cooked starch is used, the slurry becomes so viscous that it is difficult to pump at ordinary temperatures and less than 1% cooked starch will not give the desired stability. For example a slurry containing 42% total starch solids and 8% by weight cooked starch was found to have a viscosity of 7,070 centipoises at 82° F. This slurry may be readily pumped without difficulty but viscosity of the slurry increases rapidly for very small increases in cooked starch content and a slurry containing 42% total starch solids including 10% cooked starch was found to have a viscosity of 17,560 centipoises at 82° F. This represents the top limit of viscosity and beyond this point the slurry cannot be pumped at ordinary atmospheric temperatures with pumping equipment customarily employed in the starch industry. By the term "cooked starch" we mean starch which has been cooked sufficiently to paste it.

In carrying out our invention the cooked starch may be added to the slurry as a liquid or it may be added dry, but the important thing is to have the pasted starch uniformly dispersed throughout the mixture. This may be done with conventional mixing or blending equipment. If dry cooked starch is used, the starch particles should be small enough to pass through a 50-mesh standard screen in order to avoid lumping when the starch is suspended in water. We prefer, however, to first make up a slurry of raw starch, heat this slurry to cook and paste the starch and then cool the resulting starch suspension below the temperature at which raw starch pastes. Finally the solution is agitated while the raw starch granules are added.

Since the slurry may be held in storage for a prolonged period of time we prefer to add an inhibitor in order to prevent microbiological spoilage. This may be done by adding a mineral acid to adjust the pH of the slurry to a value of 3.0 or below or by adding from 0.02% to 0.08% of $SO_2$ either as a gas, liquid or in the form of the salts $NaHSO_3$ or $Na_2SO_3$. The type of starch employed in our invention is not critical and any of the cereal or non-cereal starches may be used such as corn, wheat, amioca, tapioca, potato and arrowroot starches. Pasted corn and wheat starches are somewhat more effective stabilizers than the other named starches.

A specific example showing the manner in which our invention is carried out is as follows:

8.08 pounds of starch were slurried into 176 pounds of water at a temperature not over 140° F. The mixture was heated and held at 190° to 212° F. for about 5 to 10 minutes to cook and paste the starch. The aqueous suspension of pasted starch was then cooled to 135° F. and 308 pounds of raw uncooked starch (37% moisture) were added with constant agitation. The resulting slurry was stored in drums and after 30 days the raw starch granules were still in suspension and the slurry in condition to be pumped.

While our slurries are particularly valuable for shipment in tank car lots, they may be used also in industrial processes where it is desirable to store raw uncooked starch granules in aqueous slurries without agitation.

It will be understood that the example is merely intended to give a specific illustration of the way our invention can be carried out and is not intended to imply any limitations on the variations that may be employed.

What we claim is:

1. A starch slurry adapted to be shipped in tank cars, tank trucks and the like which contains about 42 to 45% total starch solids comprising a mixture of raw uncooked starch granules suspended in water containing a dispersion of cooked starch in the proportion of about 1% to 10% by weight of total starch solids, said slurry having a viscosity not over 17,560 centipoises at 82° F. so that it may be pumped at ordinary atmospheric temperatures and said slurry being characterized by the fact that it is substantially stable so that the raw starch granules remain in suspension over a prolonged period of time.

2. A composition of matter as specified in claim 1 which includes about 0.02% to 0.08% of $SO_2$ in solution.

3. A composition of matter as specified in claim 1 in which the pH of the solution is not more than 3.0.

References Cited in the file of this patent

UNITED STATES PATENTS

| | | |
|---|---|---|
| 492,515 | Lobdell | Feb. 28, 1893 |
| 1,253,397 | Lenders | Jan. 15, 1918 |
| 1,391,065 | Lenders | Sept. 20, 1921 |
| 1,418,275 | Benjamin | June 6, 1922 |
| 2,098,293 | Jefferies | Nov. 9, 1937 |
| 2,433,285 | Marrone | Dec. 23, 1947 |
| 2,442,658 | Lloyd | June 1, 1948 |
| 2,528,008 | La Vine | Oct. 31, 1950 |
| 2,582,198 | Etheridge | Jan. 8, 1952 |

OTHER REFERENCES

Radley: "Starch and Its Derivatives," N. Y., 1944, pgs. 57–59 and 341.